United States Patent [19]

Yoshida

[11] 4,364,447
[45] Dec. 21, 1982

[54] STEERING SYSTEM FOR SNOWMOBILE STEERABLE SKIS

[75] Inventor: Keisuke Yoshida, 6555 Katella Ave., Cypress, Calif. 90630

[73] Assignee: Yamaha Hatsudoki Kabushiki Kaisha, Iwata, Japan

[21] Appl. No.: 301,215

[22] Filed: Sep. 11, 1981

Related U.S. Application Data

[63] Continuation of Ser. No. 75,138, Sep. 12, 1979, abandoned.

[30] Foreign Application Priority Data

Sep. 29, 1978 [JP] Japan ............................... 53-120620
Nov. 30, 1978 [JP] Japan ............................... 53-148508

[51] Int. Cl.³ .................... B62B 17/04; B62M 27/02
[52] U.S. Cl. ................................... 180/182; 180/190; 280/16; 280/21 R; 280/668
[58] Field of Search ............... 180/182, 183, 190, 191, 180/192, 193, 194, 195; 280/16, 17, 21 R, 25, 26, 269, 276, 666, 668, 670, 672, 104, 696

[56] References Cited

U.S. PATENT DOCUMENTS

| | | | |
|---|---|---|---|
| 2,756,070 | 7/1956 | Torre | 280/276 |
| 3,398,970 | 8/1968 | Horiuchi | 280/16 |
| 3,425,707 | 2/1969 | Horiuchi et al. | 280/16 |
| 3,504,752 | 4/1970 | Milward | 180/190 |
| 3,565,455 | 2/1971 | Kostas | 280/672 |
| 3,931,862 | 1/1976 | Cote | 280/21 R |
| 3,977,485 | 8/1976 | West et al. | 280/21 R |

*Primary Examiner*—Joseph F. Peters, Jr.
*Assistant Examiner*—Donn McGiehan
*Attorney, Agent, or Firm*—Donald D. Mon

[57] ABSTRACT

A steering system for vehicles, for example snowmobiles. A strut-type suspension includes a fixed tube mounted to the chassis and a movable tube axially reciprocable in the fixed tube. A collar is mounted to structure attached to the chassis, and is rotatable around the axis of the movable tube. A scissors type linkage interconnects the collar and a ski, or a mount for a ski, or the movable tube. Preferably the collar includes an arm which extends rearwardly into the vehicle body.

5 Claims, 6 Drawing Figures

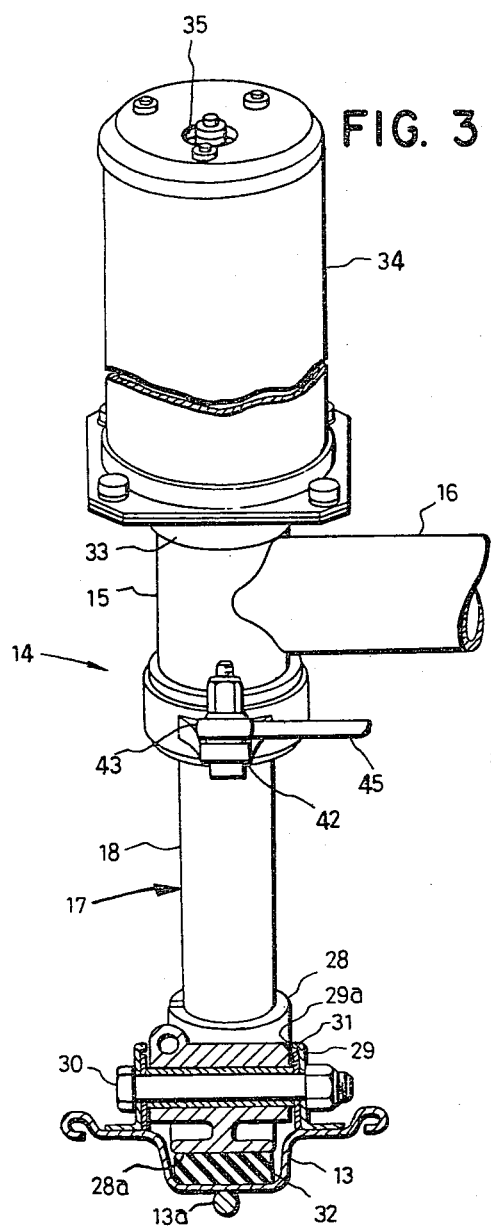
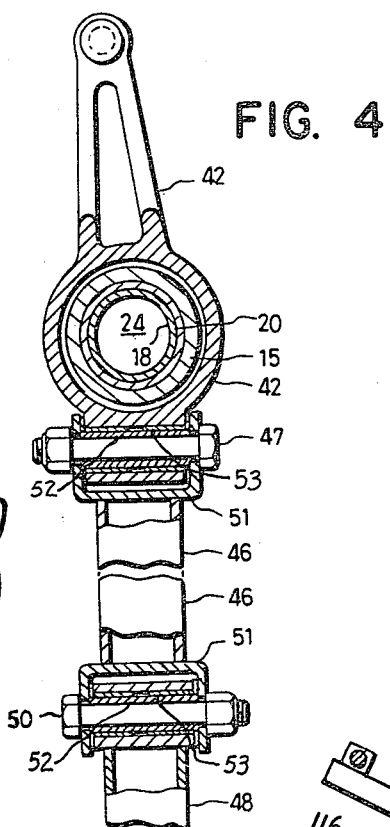
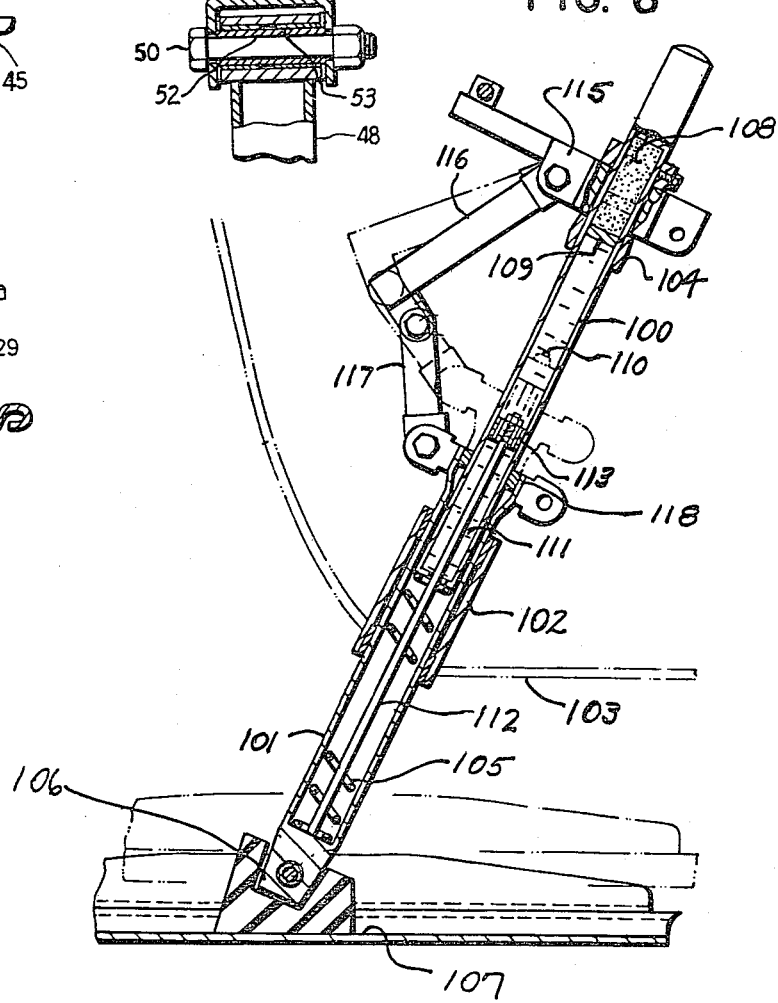

STEERING SYSTEM FOR SNOWMOBILE STEERABLE SKIS

CROSS-REFERENCE TO OTHER APPLICATION

This is a continuation of applicant's co-pending U.S. patent application, Ser. No. 75,138, filed Sept. 12, 1979 now abandoned.

FIELD OF THE INVENTION

A steering system for vehicles such as snowmobiles.

BACKGROUND OF THE INVENTION

Vehicles such as snowmobiles have very active front end suspensions, at the end of which there is a unit such as a ski which is to be steered. It is common practice to steer the ski by turning some portion of the suspension system. Over a period of time wear can be expected to occur and a considerable amount of play both in the suspension and in the steering linkage results. Snowmobiles are subjected to very hard usage, and looseness or play in the suspension or steering mechanism is undesirable.

It is an object of this invention to provide a steering system which can overcome many of the effects of the prior art. For example, prior art strut-type steering ski suspension assemblies have been constructed so that a movable tube or strut directly supports the steering ski and is supported slidably in both the rotational and vertical directions with respect to the chassis of the snowmobile. In order to transmit the steering force from the steering mechanism to this movable tube, a steering arm aligned with the axis of rotation of the movable tube engages directly with the movable tube, slidably on the vertical direction but fixedly in the rotational direction. Such arrangements are shown in U.S. Pat. Nos. 3,931,862 and 3,977,485. After a period of use, undesirable slackness and play results between the steering arm and the movable tube.

Another objection to the prior art is that the movable tube is subjected to torsional force when the steering force is applied. This over a period of time can be deleterious to the movable tube and to its supporting mechanisms.

Yet another objection to the prior art is that the sliding surface of the movable tube, which should be kept as smooth and clean as possible in order to make a fluid sealing contact is exposed to and can be damaged by brushes or twigs during running operations.

Yet another problem in the prior art is the likelihood that the steering mechanism will collide against the steering ski and the chassis if a linkage is employed to transmit the steering force.

It is an object of this invention to overcome the foregoing problems of the prior art.

BRIEF DESCRIPTION OF THE INVENTION

A steering system according to this invention is used in combination with a vehicle chassis, such as snowmobile body. It includes a fixed tube attached to the chassis, within which a movable tube is rotatably and vertically slidable in order that a steering force may be transmitted to it through some other member such as a linkage, and in order that it can reciprocate to perform its suspension functions. A collar is rotatable around the axis of the movable tube, and one link of a scissors linkage is connected to it. The other link is connected to the ski or a mount for the ski, or to the movable tube itself.

According to a preferred but optional feature of the invention, the fixed tube projects downwardly and forwardly from the bottom of the chassis cowling, and the collar is mounted directly on the outer circumference of the stationary tube and has an arm which extends rearwardly into the body of the vehicle.

The above and other features of this invention will be fully understood from the following detailed description and the accompanying drawings, in which:

BRIEF DESCRIPTION OF THE DRAWINGS

FIG. 3 is a side elevation partly in cutaway cross-section showing a portion of FIG. 2 this view being taken along line III—III therein;

FIG. 4 is a section taken at line IV—IV in FIG. 2;

FIG. 6 is a side elevation partly in cutaway cross-section, showing yet another embodiment of the invention.

DETAILED DESCRIPTION OF THE INVENTION

Figure 1:
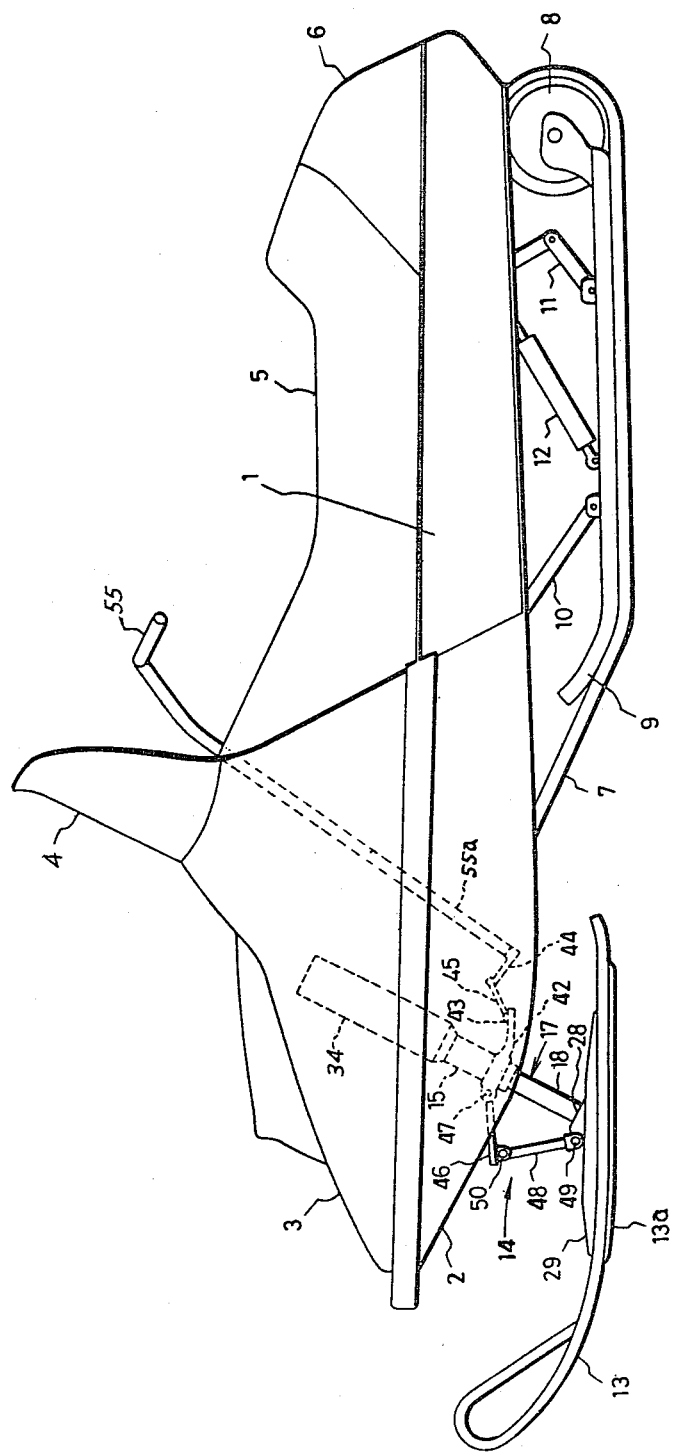
FIG. 1 is a side elevation showing a snowmobile incorporating the invention.

In FIG. 1, reference numerals 1, 2 and 3 indicate a chassis, a body shell covering the lower front of the chassis 1, and a body shell covering the upper front of the chassis 1, respectively. A windshield 4, a driver's seat 5, a luggage box 6, a pair of endless tracks 7 (which will be shortly referred to as tracks), a pair of guide wheels 8 tensioning the tracks 7 backward, and a pair of slide rails 9 are connected to the chassis. Each of slide rails 9 is arranged to contact with the inner side of the corresponding track 7, and is mounted to the aforementioned chassis 1 through links 10 and 11, a shock absorber 12 and a spring (not shown) in such a manner that the track 7 will be elastically held. The front end of track 7 runs on a sprocket wheel (not shown) so that the driving force of a prime mover is transmitted thereto through a centrifugal type stepless reduction gear mechanism and the sprocket wheel.

A pair of steering skis 13 are arranged below bottom cover 2. These steering skis 13 are suspended vertically elastically by means of a suspension assembly 14, which will be described in detail later, and are steered to the right and left at a varying steering angle by means of steering handlebars 55. A metal runner 13a is secured to the sliding surface of each of the skis 13.

Figure 2:
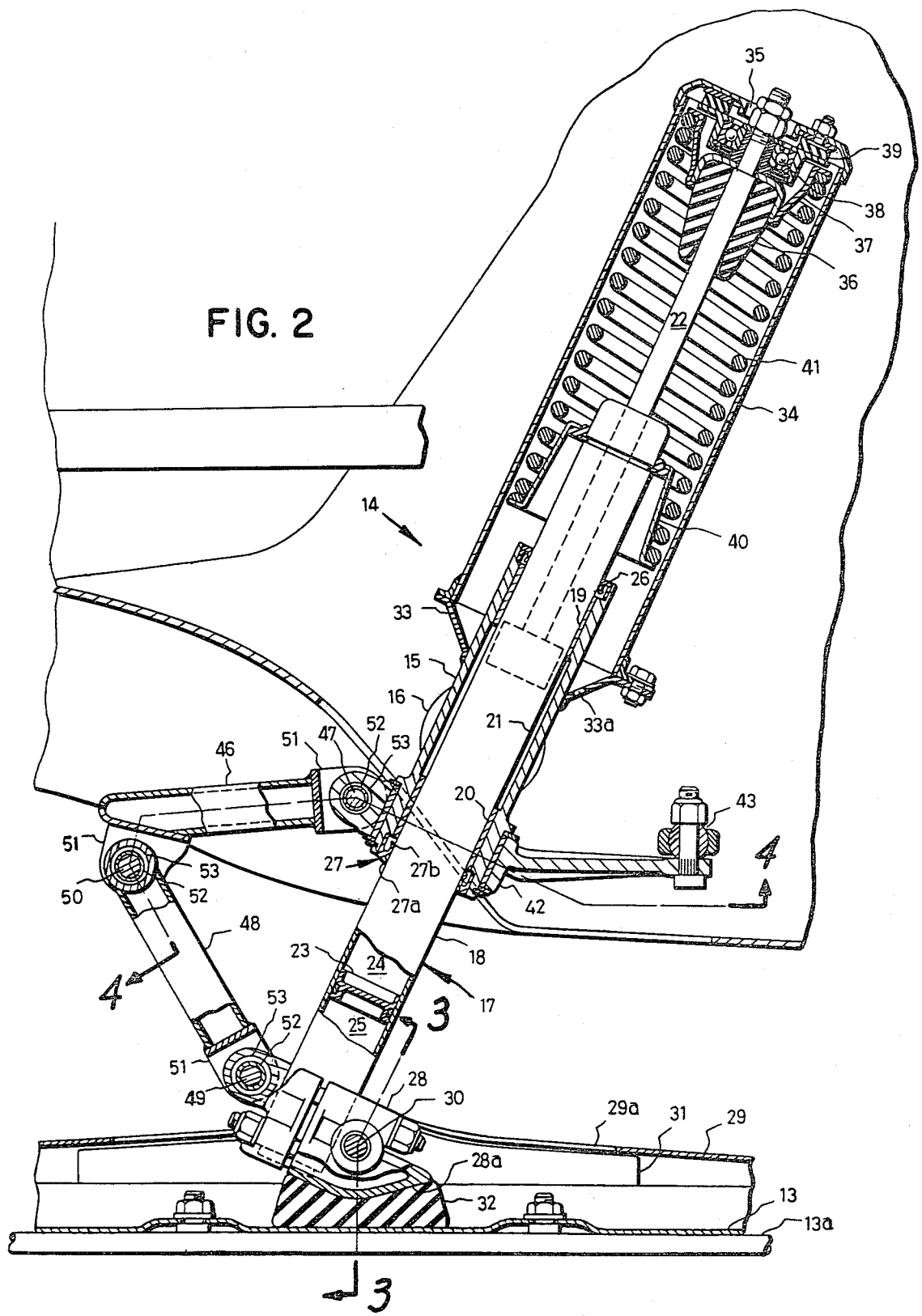
FIG. 2 is a side elevation, partly in axially cutaway cross-section, showing the presently preferred suspension system according to the invention.

Suspension assembly 14 is held, as best seen in FIGS. 2 and 3, in a stationary cylinder 15 (sometimes called a "fixed tube") which is fixed to the front extension of the aforementioned chassis 1. More specifically, the stationary cylinder 15 is fixed, while having its center axis slightly inclined backward, to both ends of a member 16 which extends transversely, and constitutes a portion of chassis 1. A strut or hydraulic shock absorber 17 is received in the stationary cylinder thus constructed. That is to say, in the embodiment being described, the strut adapted to slide within the stationary cylinder 15 is made capable of acting as the shock absorber 17. Cylinder 18 (sometimes called a "movable tube" or "plunger" is embraced, aligned, and laterally restrained by means of a pair of upper and lower bearings 19, 20 so that the cylinder 18 can rotate and move up and down. It is directed downwardly and forwardly relative to the chassis. The space which is defined by the inner wall of the stationary cylinder 15 and the outer wall of the cylinder 18 between bearings 19 and 20 forms a grease chamber 21.

Shock absorber 17 is of the pneumatic type, with its piston rod 22 protruding upward. As a result, a slidable and axially unrestrained free piston 23 within cylinder 18 is located at a lower position of the shock absorber 17, and a pre-pressurizing gas chamber 25, isolated from an oil chamber 24 by the free piston 23 is located at the lower end of the movable tube. Pre-pressurizing gas chamber 25 is charged with nitrogen gas under high pressure (e.g., 15 to 25 kg/cm$^2$) so that the increase in the volume of the oil chamber 24 accompanying the entry of the piston rod 22 into the cylinder 18 is compensated by the movement of the free piston 23 and so that a preload in the extending direction is imparted to the piston rod 22. The lowered end of cylinder 18 is reduced to a joint for a bracket 28 (sometimes called a "gusset"), and its lowermost end face is formed with a port for filling gas into gas chamber 25.

In the upper end of the stationary cylinder 15, there is mounted a seal member 26 for sealing the gap between cylinders (tubes) 15 and 18. Another seal member 27 for sealing this gap is mounted in the lower end of the stationary cylinder 15. Seal member 27 comprises a downwardly extending lip 27a for repelling ice and an upwardly extending lip 27b acting as an oil seal. Since that portion of the cylinder, which is located below the stationary cylinder 15, is exposed to the outside, that portion will be attacked by snow or ice especially during parking. As has been mentioned above, seal member 27 is formed with the ice repelling lip 27a in addition to the oil sealing lip 27b so that oil sealing lip 27b is protected from damage by ice, thereby to increase the durability of the seal member 27. Since, moreover, cylinder 18 has its pre-pressurizing gas chamber 25 located at a low position where it will be exposed to the outside, the cooling effects obtainable are excellent. More specifically, the temperature of the shock absorber 17 is raised during the running operation of the snowmobile. As a result of this temperature rise, the nitrogen gas expands more than the oil because of its higher coefficient of cubic expansion. By cooling the gas chamber 25 variation in the preload to be imparted to the piston rod 22 due to temperature variation is minimized.

Also, the portion of the movable tube below the fixed tube that contains oil is cooled. This reduces viscosity variations caused by variations in temperature, and tends to stabilize the dampening operation of the shock absorber.

Skis 13 are pivotally (tiltably) connected to the lower end of cylinder 18. More specifically, a bracket (gusset) 28 is fixed to the lower end of cylinder 18. A cover 29 having a generally dome-shaped section is secured to the ski 13. Thus, bracket 28 is pivotally supported by means of a pivot pin 30 such that it is located within the opening 29a which is formed in the cover 29. Incidentally, there is interposed between cover 29 and bracket 28 a reinforcement 31 which is secured to the inner side of the cover 29. On the other hand, bracket 28 has its lower side 28a bulging downward, and a resilient member 32 (Sometimes called a "cushion") is sandwiched between the bulging lower side 28a and the ski 13. As a result, the ski 13 is biased to return to its horizontal position.

There is secured to the outer circumference of the aforementioned stationary cylinder 15 a flange 33 which has an upwardly diverging and generally funnel-shaped cross-section. This flange 33 is jointed to the open end of a cylinder 34. The flange 33 is formed with a drain hole 33a for an air vent and drain port. On the other hand, cylinder 34 has at the center of its upper end face an opening 35 therethrough, which faces the upper end of piston rod 22. A bearing 38 has its inner race fixed to the upper end portion of piston rod 22. A stopper 36 (buffer) made of a resilient material and a spring seat 37 and its outer race are jointed to the upper end face of spring 41 through an annular elastic member 39 which is shrink-fitted therein. As a result, the piston rod 22 is held to the chassis 1. Thanks to the interposition of the elastic member 39, the possible misalignment between the bearings 19 and 20 and the piston rod 22 due to the vertically telescopic movements of the cylinder 18 can be compensated. Member 31 permits limited lateral shear-like movement between the upper end face of cylinder 34 and the upper end of the piston rod. A spring seat 40 is held on the upper portion of cylinder 18 so that a coiled compression spring 41 is retained in compression between spring seat 40 and the other spring seat 37 at the side of the piston rod 22. Since, in that way, the piston rod 22 held to chassis 1, it follows that the compression spring 41 is retained between the cylinder 18 and a portion of chassis 1.

Reference numeral 42 indicates a steering arm with a collar which is mounted rotatably on the outer circumference of the lower portion of fixed tube 15. Steering arm 42 has a portion extending rearwardly, and which carries a ball joint 43. Reverting to FIG. 1, a pitman arm 44 is fixed to the lower end of the handle column 55a of the handle 55 and has its rotatable end connected to the ball joint 43 of the steering arm 42 by means of a tie rod 45.

A link 46 is connected pivotally to the front side of the arm 42 (and to its collar) by means of a pivot pin 47, which is arranged at a right angle with respect to the center axis of shock absorber 17, and substantially in parallel with the pivot pin 30 of the aforementioned ski 13. Another link 48 is connected pivotally to the front side of bracket 28, which is mounted on the lower end of the movable (or plunger), by means of a pivot pin 49. Those two links 46 and 48 are connected pivotally to each other by means of still another pivot pin 50. These pivot pins 49 and 50 are arranged in parallel with the aforementioned pivot pin 47, and all are perpendicular to a plane which includes the forward axis of the ski and the central axis of the movable tube (plunger). The connecting portions of pivot pins 47, 49 and 50 are made to have the construction shown in FIG. 4. Although the connecting portion of pivot pin 49 is not shown in FIG. 4, it has a construction similar to those of the other pivot pins. Incidentally, reference numerals 52 and 53 indicate a collar and a metal bearing, respectively.

In operation, when the aforementioned steering handlebars 55 are turned, the steering arm 42 is turned through the pitman arm 44, the tie rod 45 and the ball joint 43. Since the links 46 and 48 are connected to the front side of the steering arm 42 by means of the pivot pins 47 and 50 which are arranged at a right angle with respect to the shock absorber 17, the links are going to rotate. On the other hand, since the aforementioned cylinder 18 and the piston rod 22 are held rotatably in the stationary cylinder 15 and the bearing 38, respectively, not only the bracket 28 at the lower end of the cylinder 18 but also the ski 13 are turned, together with the movable tube. Since, moreover, the aforementioned link 48 is pivotally connected at its lower end to the bracket 28 by means of the pivot pin 49 which is in parallel with the pivot pins 47 and 50, the steering arm 42 and the ski 13 turn together.

On the other hand, since the cylinder 18 of the shock absorber 17 is held telescopically in the stationary cylinder 15 such that its upper end portion is supported elastically by the compression spring 41, the ski 13 can move up and down along the center axis of the shock absorber 17 together with cylinder 18. At this time, the spacing between the steering arm 42 and the bracket 28 is so changed that the pivot pins of the links 46 and 48 accordingly rotate. Since, in this instance, the pivot pins 47, 49 and 50 are arranged to intersect the center axis of the shock absorber 17 at a right angle, the links 46 and 48 move in the plane extending through that center line (i.e., in the plane parallel to the surface of the sheet printed with FIG. 4) so that the steering angle of the ski 13 can be prevented from varying even if the ski 13 moves up and down.

Figure 5:
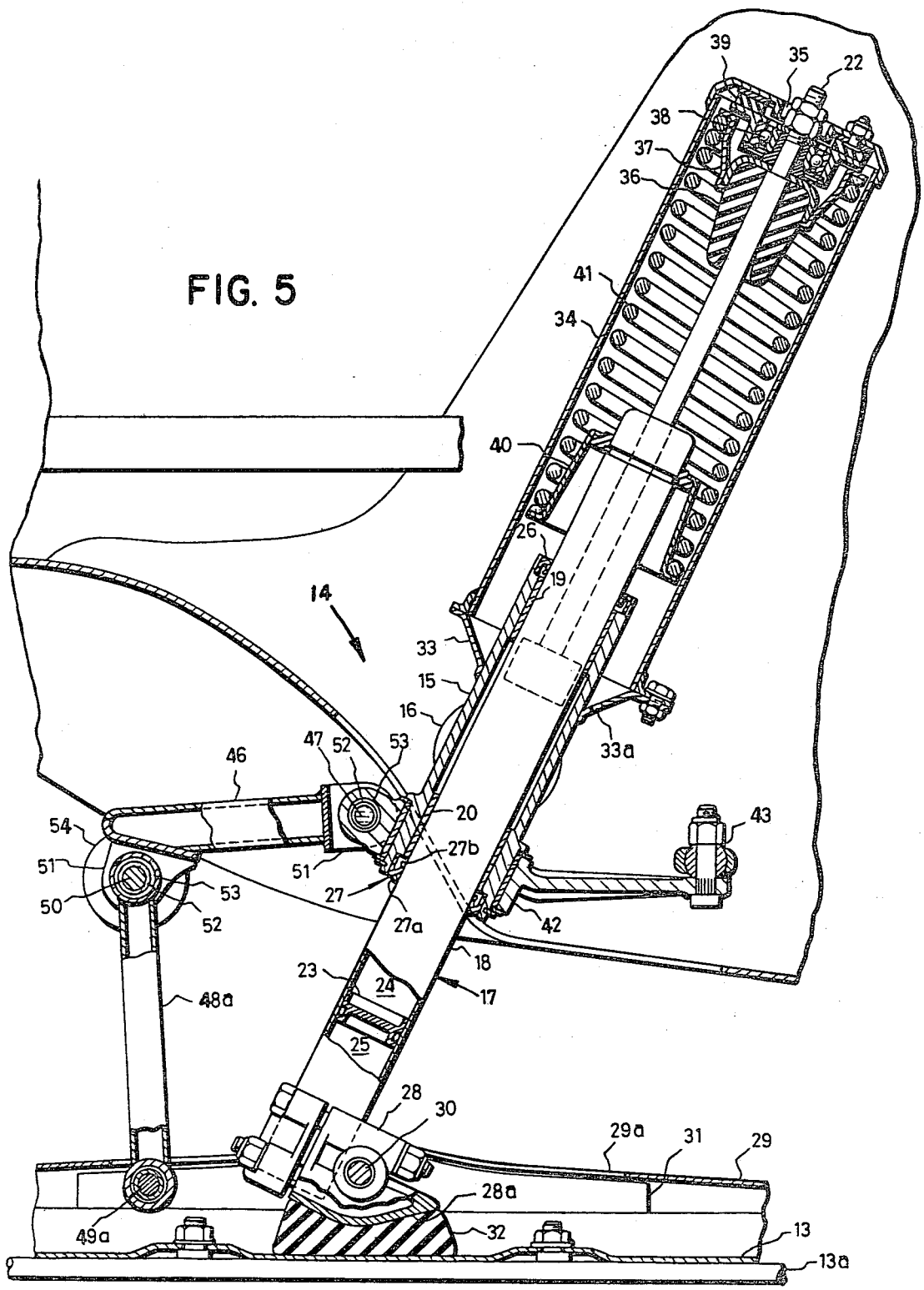
FIG. 5 is a side elevation, partly in axial cross-section, showing another embodiment of the invention.

FIG. 5 is a partially sectional side elevation showing another embodiment of the present invention. In FIG. 5, the same parts and portions as those appearing in FIG. 2 are indicated by the same reference numerals, and as such repeated explanations will be omitted here. In the second embodiment, the lower link 48a of the links for transmitting the rotations of the steering arm 42 is made to have its lower end pivotally connected directly to the ski 13, and a solid friction type shock absorber 54 is mounted on the pivot pin 50, at which the link 46 and 48 are pivotally connected. More specifically, the shock absorber 54 is composed of two friction pads which are forced into contact with each other. One of the friction pads is retained at the side of the link 46 whereas the other is retained at the side of the link 48a. The lower end of the link 48a is mounted pivotally through the aforementioned reinforcement 31 by means of a pivot pin 49a in the opening 29a which is formed in the aforementioned cover 29 of the ski 13.

As a result, in case the ski 13 rocks about the pivot pin 30 while running on a rough surface of snow, the angle between the links 48a and 46 is accordingly varied, but the rocking motions of the ski 13 are promptly absorbed by the friction between the two friction pads of the shock absorber 54.

Since the second embodiment has its shock absorber 54 mounted on the pivot pin 50, at which the links 46 and 48a are connected, its construction can be made simple and compact in comparison with the prior art, in which a cylindrical shock absorber is mounted.

As has been described, in a snowmobile equipped with a strut type steering ski suspension assembly according to the present invention, both the fixed tube holding the strut, and the steering arm made coactive with the steering handlebars, are pivotally supported on the center axis of the strut, and the links connecting the steering arm and the steering ski are arranged in front of the strut. As a result, those links are arranged in front of the exposed portions of the movable tube below the strut so that these exposed portions can be prevented from colliding against an obstacle, if any, which comes out of the snow surface surface while the snowmobile is running. The exposed portions of the movable tube are thereby protected from being damaged. This ensures smooth relative movements between the stationary cylinder and the strut thereby to extend the lifetime of the suspension assembly although those exposed portions not only move into and out of the stationary cylinder, but also rotate in the same. Since, moreover, the links always face in the running direction of the snowmobile, the sliding surface of the strut is always protected.

FIG. 6 shows an embodiment wherein an inner tube is the fixed tube 100, and an outer tube is the movable tube 101. A sleeve bearing 102 fixed to the chassis 103 slidably and rotatably mounts tube 101. A portion 104 of chassis 103 fixedly mounts fixed tube 100. A bias spring 105 biases the movable tube toward its free end 106 where a ski 107 is jointed to it.

A conventional pre-pressurizing gas chamber 108, free piston 109, oil chambers 110, 111, rod 112 and piston 113 are provided for the same purposes as in the other embodiments. Appropriate seals are provided.

A steering collar 115 is rotatably mounted to portion 104, and is rotatable around the axis of the suspension. A pair of links 116, 117 are jointed to one another, and to the collar as in the previous embodiments. However, in this embodiment, the joint of link 117 with the movable tube is at a flared and sealed end 118 well-spaced from the ski end.

Turning the steering collar will turn the linkage and thereby turn the movable tube, as before. By jointing the linkage to the movable tube where shown, there results some torque on the movable tube when steering is performed. For a potential trade-off advantage, the linkage can be positioned inside the chassis, and the movable tube can be supported near to its end by sleeve bearing 102, giving a somewhat less cluttered appearance.

This invention is not to be limited by the embodiments shown in the drawings and described in the descriptive, which are given by way of example and not of limitation, but only in accordance with the scope of the appended claims.

I claim:

1. A steering system for the steering of a vehicle to be operated on a snowy surface, said vehicle having a body shell, said system comprising: a fixed tube mountable to the chassis of such a vehicle and having a central steering axis which extends downwardly from and forwardly relative to the vehicle so as to form an angle with level ground which is other than a right angle; a movable plunger having an axis, said plunger being coaxially mounted to said fixed tube for axial and rotational movement relative thereto; bias means biasing the plunger toward its lower end; a ski pivotally connected to said lower end for tiltable rotation only around a single tilt axis perpendicular to said steering axis so the ski and the plunger turn together around said steering axis; a steering arm rotatably mounted to the outer circumference of said fixed tube for rotation around said steering axis; a first steering arm portion extending rearwardly into the inside of said body shell; a second steering arm portion extending forwardly and projecting outside of said body shell; a scissors type two link linkage disposed outside of said body shell, the links of said linkage rotating relative to each other, only in a single plane which includes the steering axis, a pivot pin pivotally joining said links to one another at one of their ends, another pivot pin pivotally joining one of said links at its other end to said second steering arm portion outside of said body shell, and yet another pivot pin pivotally joining the other link to structure which causes said ski and said plunger to rotate around said steering axis, all of said pivot pins being parallel to one another, whereby turning said steering arm will turn said structure and said plunger; and steering means including a tie rod inside said body shell connected to said first steering arm portion to turn the same.

2. Apparatus according to claim 1 in which said structure is a gusset that is attached to said plunger near its end connected to said ski, whereby turning of said steering arm exerts substantially no twisting force on said plunger, said plunger being freely rotatably inside said fixed tube.

3. Apparatus according to claim 1 in which said structure comprises, an element mounted to said ski, and spaced from said tube, whereby turning of said steering arm exerts substantially no twisting force on said plunger, said plunger being freely rotatable inside said fixed tube.

4. Apparatus according to claim 1 in which said structure is said plunger itself.

5. Apparatus according to claim 1 in which said scissors type linkage is disposed adjacent to said ski, is located beneath the vehicles body shell, and is forwardly-directed, ahead of said plunger so as to protect said plunger from abrasion by objects encountered in the course of forward motion.

* * * * *